(12) United States Patent
Hedin et al.

(10) Patent No.: US 7,424,307 B2
(45) Date of Patent: Sep. 9, 2008

(54) LOSS OF PAGE SYNCHRONIZATION

(75) Inventors: John M. Hedin, Coon Rapids, MN (US); Jeffrey J. Cannon, St. Louis Park, MN (US); Douglas D. Weaver, Plymouth, MN (US); Santosh K. Sonbarse, Eden Prairie, MN (US); William J. Mitchell, Eden Prairie, MN (US); Michael J. Hermel, Waseca, MN (US); Donald R. Bauman, Waseca, MN (US); Jerry E. Toms, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 468 days.

(21) Appl. No.: 11/094,950

(22) Filed: Mar. 31, 2005

(65) Prior Publication Data

US 2006/0227737 A1    Oct. 12, 2006

(51) Int. Cl.
*H04M 1/00* (2006.01)

(52) U.S. Cl. .............. 455/552.1; 455/554.1; 455/554.2; 455/560; 455/561; 455/41.2; 455/550.1; 370/277; 370/278; 370/338; 370/340; 370/341; 725/4; 714/798

(58) Field of Classification Search .............. 455/552.1, 455/554.1, 554.2, 560, 561, 41.2, 41.3, 103, 455/550.1; 370/277, 278, 338, 340, 341; 725/4; 714/798
See application file for complete search history.

(56) References Cited

U.S. PATENT DOCUMENTS

| | | | |
|---|---|---|---|
| 4,569,042 A | 2/1986 | Larson | |
| 5,184,347 A | 2/1993 | Farwell et al. | |
| 5,276,691 A * | 1/1994 | Kivari .................. | 714/798 |
| 5,544,222 A | 8/1996 | Robinson et al. | |
| 5,619,504 A | 4/1997 | Van Grinsven et al. | |
| 5,649,000 A | 7/1997 | Lee et al. | |

(Continued)

FOREIGN PATENT DOCUMENTS

EP    0936453    8/1999

(Continued)

OTHER PUBLICATIONS

U.S. Appl. No. 11/095,628, Toms et al.

(Continued)

*Primary Examiner*—Stephen M D'Agosta
(74) *Attorney, Agent, or Firm*—Fogg & Powers LLC (57) ABSTRACT

Systems and methods for maintaining data stream synchronization are provided. A system comprises one or more radio head interface modules and a call processing software module each adapted to communicate with each other. The call processing software module performs modulation and demodulation of voice and data streams using one or more air interface standards. The call processing software module communicates a forward data stream to a first radio head interface module. The forward data stream comprises a plurality of data samples representing voice and data streams and a plurality of fixed synchronization words. When the first radio head interface module does not observe the receipt of a first fixed synchronization word of the plurality of fixed synchronization words word from the call processing software module when expected, the first radio head interface module concludes that it has lost synchronization with the call processing software module.

48 Claims, 8 Drawing Sheets

U.S. PATENT DOCUMENTS

| | | | |
|---|---|---|---|
| 5,701,294 A | 12/1997 | Ward et al. |
| 5,854,978 A | 12/1998 | Heidari |
| 5,970,069 A | 10/1999 | Kumar et al. |
| 6,047,002 A | 4/2000 | Hartmann et al. |
| 6,091,765 A | 7/2000 | Pietzold, III et al. |
| 6,097,733 A | 8/2000 | Basu et al. |
| 6,188,898 B1 | 2/2001 | Phillips |
| 6,363,421 B2 | 3/2002 | Barker et al. |
| 6,381,289 B1 | 4/2002 | Dutta |
| 6,463,060 B1 | 10/2002 | Sato et al. |
| 6,496,546 B1 | 12/2002 | Allpress et al. |
| 6,501,785 B1 | 12/2002 | Chang et al. |
| 6,544,428 B1 | 4/2003 | Higashi |
| 6,584,146 B2 | 6/2003 | Bose et al. |
| 6,636,747 B2 | 10/2003 | Harada et al. |
| 6,715,007 B1 | 3/2004 | Williams et al. |
| 6,728,228 B1 | 4/2004 | Ostman et al. |
| 6,775,303 B1 | 8/2004 | Rustad et al. |
| 6,775,305 B1 | 8/2004 | Delvaux |
| 6,788,961 B2 | 9/2004 | Repice et al. |
| 6,810,270 B1 | 10/2004 | Grohn et al. |
| 6,829,229 B1 | 12/2004 | Palermo et al. |
| 6,876,864 B1 | 4/2005 | Chapin |
| 6,882,851 B2 | 4/2005 | Sugar et al. |
| 6,889,354 B2 | 5/2005 | Feldman et al. |
| 6,912,228 B1 | 6/2005 | Dahlman et al. |
| 6,931,074 B1 | 8/2005 | Palermo et al. |
| 7,035,932 B1 | 4/2006 | Dowling |
| 7,058,789 B2 | 6/2006 | Henderson et al. |
| 7,069,574 B1 | 6/2006 | Adams et al. |
| 7,099,687 B1 | 8/2006 | Makela et al. |
| 7,116,682 B1 | 10/2006 | Waclawsky et al. |
| 7,151,925 B2 | 12/2006 | Ting et al. |
| 7,190,682 B2 | 3/2007 | Shepherd et al. |
| 7,203,488 B2 | 4/2007 | Luneau |
| 7,315,571 B1 | 1/2008 | Heidari et al. |
| 2001/0024430 A1 | 9/2001 | Sekine et al. |
| 2001/0031621 A1 | 10/2001 | Schmutz |
| 2001/0037395 A1 | 11/2001 | Sabat, Jr. et al. |
| 2002/0035633 A1 | 3/2002 | Bose et al. |
| 2002/0093983 A1 | 7/2002 | Newberg et al. |
| 2002/0169894 A1 | 11/2002 | Takla |
| 2002/0186436 A1 | 12/2002 | Mani et al. |
| 2002/0186674 A1 | 12/2002 | Mani et al. |
| 2002/0187809 A1 | 12/2002 | Mani et al. |
| 2002/0191565 A1 | 12/2002 | Mani et al. |
| 2003/0036359 A1 | 2/2003 | Dent et al. |
| 2003/0050098 A1 | 3/2003 | D'Agati et al. |
| 2003/0142649 A1 | 7/2003 | Taniguchi |
| 2004/0001429 A1 | 1/2004 | Ma et al. |
| 2004/0005866 A1 | 1/2004 | Igarashi |
| 2004/0033806 A1 | 2/2004 | Daniel et al. |
| 2004/0042387 A1 | 3/2004 | Geile |
| 2004/0132477 A1 | 7/2004 | Lundby et al. |
| 2004/0156328 A1 | 8/2004 | Walton et al. |
| 2004/0156449 A1 | 8/2004 | Bose et al. |
| 2004/0198410 A1* | 10/2004 | Shepherd et al. ......... 455/550.1 |
| 2004/0198453 A1 | 10/2004 | Cutrer et al. |
| 2004/0209580 A1* | 10/2004 | Bose et al. ................. 455/103 |
| 2005/0190855 A1 | 9/2005 | Jin et al. |
| 2005/0280564 A1 | 12/2005 | Lee |
| 2006/0034242 A1 | 2/2006 | Proctor, Jr. |
| 2006/0141957 A1 | 6/2006 | Fischer et al. |
| 2006/0222054 A1 | 10/2006 | Conyers et al. |
| 2006/0227736 A1 | 10/2006 | Conyers et al. |
| 2007/0032241 A1 | 2/2007 | Busch et al. |

FOREIGN PATENT DOCUMENTS

| | | |
|---|---|---|
| EP | 1211817 | 6/2002 |
| WO | 0159993 | 8/2001 |
| WO | 2004047316 | 6/2004 |

OTHER PUBLICATIONS

U.S. Appl. No. 11/095,789, Hedin et al.
U.S. Appl. No. 11/094,848, Weaver et al.
U.S. Appl. No. 11/095,111, Hermel et al.
U.S. Appl. No. 11/095,112, Hedin et al.
U.S. Appl. No. 11/094,949, Hedin et al.
U.S. Appl. No. 11/095,113, Hedin et al.
U.S. Appl. No. 11/095,788, Conyers et al.
U.S. Appl. No. 11/094,947, Conyers et al.
U.S. Appl. No. 11/094,907, Conyers et al.
U.S. Appl. No. 11/095,150, Bauman et al.
U.S. Appl. No. 11/095,779, Hermel et al.

* cited by examiner

LOSS OF PAGE SYNCHRONIZATION

CROSS REFERENCES TO RELATED APPLICATIONS

This application is related to the following co-pending U.S. patent applications filed on even date herewith, all of which are hereby incorporated herein by reference:

U.S. patent application Ser. No. 11/095,788, filed on Mar. 31, 2005 and entitled "DYNAMIC FREQUENCY HOPPING") and which is referred to here as the '672 Application;

U.S. patent application Ser. No. 11/095,628, filed on Mar. 31, 2005 and entitled "DYNAMIC DIGITAL UP AND DOWN CONVERTERS" and which is referred to here as the '673 Application;

U.S. patent application Ser. No. 11/095,789, filed on Mar. 31, 2005 and entitled "DYNAMIC RECONFIGURATION OF RESOURCES THROUGH PAGE HEADERS" and which is referred to here as the '675 Application;

U.S. patent application Ser. No. 11/094,848, filed on Mar. 31, 2005 and entitled "SIGNAL ENHANCEMENT THROUGH DIVERSITY" and which is referred to here as the '676 Application;

U.S. patent application Ser. No. 11/095,111, filed on Mar. 31, 2005 and entitled "SNMP MANAGEMENT IN A SOFTWARE DEFINED RADIO" and which is referred to here as the '677 Application;

U.S. patent application Ser. No. 11/095,112, filed on Mar. 31, 2005 and entitled "TIME STAMP IN THE REVERSE PATH" and which is referred to here as the '678 Application;

U.S. patent application Ser. No. 11/094,949, filed on Mar. 31, 2005 and entitled "BUFFERS HANDLING MULTIPLE PROTOCOLS" and which is referred to here as the '679 Application;

U.S. patent application Ser. No. 11/095,113, filed on Mar. 31, 2005 and entitled "TIME START IN THE FORWARD PATH" and which is referred to here as the '680 Application;

U.S. patent application Ser. No. 11/094,947, filed on Mar. 31, 2005 and entitled "DYNAMIC REALLOCATION OF BANDWIDTH AND MODULATION PROTOCOLS" and which is referred to here as the '684 Application;

U.S. patent application Ser. No. 11/094,907, filed on Mar. 31, 2005 and entitled "DYNAMIC READJUSTMENT OF POWER" and which is referred to here as the '685 Application;

U.S. patent application Ser. No. 11/095,150, filed on Mar. 31, 2005 and entitled "METHODS AND SYSTEMS FOR HANDLING UNDERFLOW AND OVERFLOW IN A SOFTWARE DEFINED RADIO" and which is referred to here as the '686 Application; and U.S. patent application Ser. No. 11/095,779, filed on Mar. 31, 2005 and entitled "INTEGRATED NETWORK MANAGEMENT OF A SOFTWARE DEFINED RADIO SYSTEM" and which is referred to here as the '700 Application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards. Current mobile communication standards introduce physical and logical channels and pose new issues in the transport of information within the communication networks.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

Some modulation standards that wireless communication networks operate with include, but are not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

In standards that implement digital processing of voice and data communications, data streams typically carry digital samples of the voice and data communications in the form of digital words of a finite bit length and multiplex into a single data stream digital words comprising voice and data communications for several end users of the communications network. Often, a plurality of digital words is bundled together into groups to increase the processing efficiency of communications network systems. Because of this, various network systems must maintain synchronization to ensure agreement about which digital words in a data stream belong to the same group. Because of the various modulation standards currently in use for wireless networks, purchasing network system components designed to operate with only a single modulation standard results in idle resources at times when network demand for that modulation standard is low.

For the reasons stated above, and for other reasons stated below that will become apparent to those skilled in the art upon reading and understanding the present specification, there is a need in the art today for methods and systems that maintain data stream synchronization that are modulation standard independent.

SUMMARY

Embodiments of the present invention address the problem of maintaining network synchronization, as well as other problems and will be understood by reading and studying the following specification.

In one embodiment, a communications system is provided. The system comprises one or more radio head interface modules and a call processing software module, the one or more radio head interface modules adapted to communicate with the call processing software module. The call processing software module performs modulation and demodulation of voice and data streams using one or more air interface standards. The call processing software module communicates a forward data stream to a first radio head interface of the one or more radio head interface modules. The forward data stream comprises a plurality of data samples representing voice and data streams and a plurality of fixed synchronization words. When the first radio head interface module does not observe the receipt of a first fixed synchronization word of the plurality of fixed synchronization words word from the call processing software module when expected, the first radio head interface module concludes that it has lost synchronization with the call processing software module.

In another embodiment, a method of page resynchronization is provided. The method comprises: communicating a data stream between a radio head interface module and a call processing software module, wherein the data stream comprises a plurality of data samples representing voice and data streams and a plurality of fixed synchronization words; observing the receipt of a first fixed synchronization word of the plurality of fixed synchronization words at an expected position within the data stream; and when the first fixed synchronization word does not occur when expected on a first logical channel, concluding that a loss of synchronization has occurred on the first logical channel between the radio head interface module and the call processing software module.

In yet another embodiment, a computer-readable medium having computer-executable instructions for page resynchronization is provided. The method comprises: communicating a data stream between a radio head interface module and a call processing software module, wherein the data stream comprises a plurality of data samples representing voice and data streams and a plurality of fixed synchronization words; observing the receipt of a first fixed synchronization word of the plurality of fixed synchronization words at an expected position within the data stream; and when the first fixed synchronization word does not occur when expected on a first logical channel, concluding that a loss of synchronization has occurred on the first logical channel between the radio head interface module and the call processing software module.

In still yet another embodiment a communications system is disclosed. The system comprises one or more radio head interface modules, means for modulating and demodulating voice and data streams using one or more air interface standards, means for communicating a forward data stream to a first radio head interface module of the one or more radio head interface modules, wherein the forward data stream comprises a plurality of data samples representing voice and data streams and a plurality of fixed synchronization words. The first radio head interface module including means for observing the receipt of a first fixed synchronization word of the plurality of fixed synchronization words sent from the means for modulating and demodulating voice and data streams at an expected position, means to stop processing the forward data stream when the first fixed synchronization word is not observed at the expected position, means to observe a second fixed synchronization word sent from the means for modulating and demodulating voice and data streams, and means to resume processing of the forward data stream upon observation of the second fixed synchronization word.

DRAWINGS

The present invention is more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout the figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems to maintain synchronization, detect loss of synchronization, and perform resynchronization of reconfigurable network hardware for mobile communications systems.

Embodiments of the present invention concern portions of a cellular telecommunications network that typically comprises one or more cellular antennas, a radio head unit transmitting and receiving voice and/or data communications over the cellular antennas, and a base station (also commonly called a base transceiver station (BTS), or a server) that communicates data between the radio head unit and a larger communication network (e.g. the public switched telephone network, or the Internet). One or more base stations are connected to a base station controller (BSC) which controls data communication flow in one or more connected base stations.

In some embodiments, communications between a BTS and a radio head unit take place through two sets of data streams. Typically, forward logical channels carry data from the BTS through the radio head unit to an end user device. Reverse logical channels carry data from end user devices through the radio head unit to the BTS. Each of the data streams is assigned a radio frequency (RF) channel and a modulation protocol, which the radio head unit uses to wirelessly communicate data with individual cellular devices.

Figure 1A:
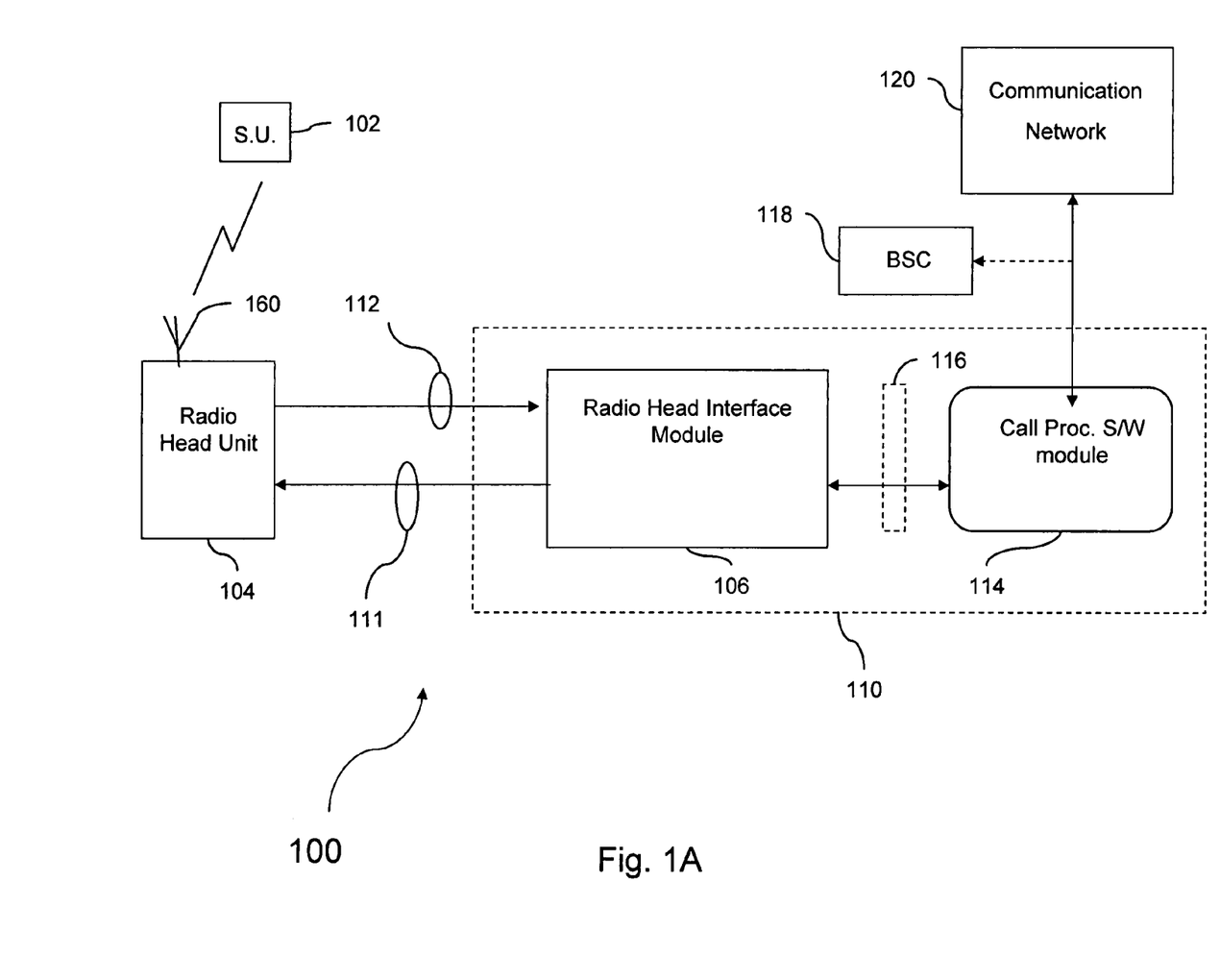
FIGS. 1A, 1B and 1C are block diagrams of one embodiment of a communications system.

FIG. 1A is a block diagram of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. In one embodiment, transport mediums 111 and 112 comprise one or more high speed transport mediums. BTS 110 is connected to one or more communication networks 120 (e.g. public switched telephone network (PSTN), Internet, a cable network, or the like). In one embodiment, BTS 110 is connected to one or more communication networks through a base station controller (BSC) 118. In one embodiment, BTS 110 includes a call processing software module 114 (or call processing software 114) that interfaces between a radio head interface module 106 and one or more communication networks 120. In one embodiment, call processing software module 114 is comprised of one or more software applications. Call processing software module 114 also includes programming which implements an SDR with BTS 110 and radio head unit 104 hardware, digitally performing waveform processing to modulate and demodulate radio signals transmitted and received, respectively from cellular antennas 160. In one embodiment, call processing software module 114 is a Vanu, Inc., Vanu Software Radio. In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided for duplicate reverse logical channels. In some embodiments, this set of duplicate reverse logical channels are called diversity channels. It should be understood that descriptions in this specification relating to embodiments of reverse logical channels also apply to such diversity channels. Further details pertaining to diversity channel are provided in the '676 application incorporated herein by reference.

In one embodiment, BTS 110 communicates with radio head unit 104 through a radio head interface module 106 (or radio head interface 106). Radio head interface 106 establishes high speed digital communication paths for two or more sets of base band data stream logical channels and all communication between BTS 110 and radio head unit 104 goes through radio head interface 106. Radio head interface module 106, radio head unit 104, and call processing software module 114, all handle multiple types of modulation protocols, and in different embodiments, one or more of the logical channels transmit data using a different modulation protocol than another logical channel. In one embodiment, radio head interface module 106, radio head unit 104, and call processing software module 114, handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, BTS 110 performs modulation and demodulation of forward and reverse logical channel voice and data streams using one or more of the air interface standard protocols. In one embodiment, the forward and reverse logical channel data streams carry complex RF data samples representing digital voice and data communications.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface.

Figure 1B:
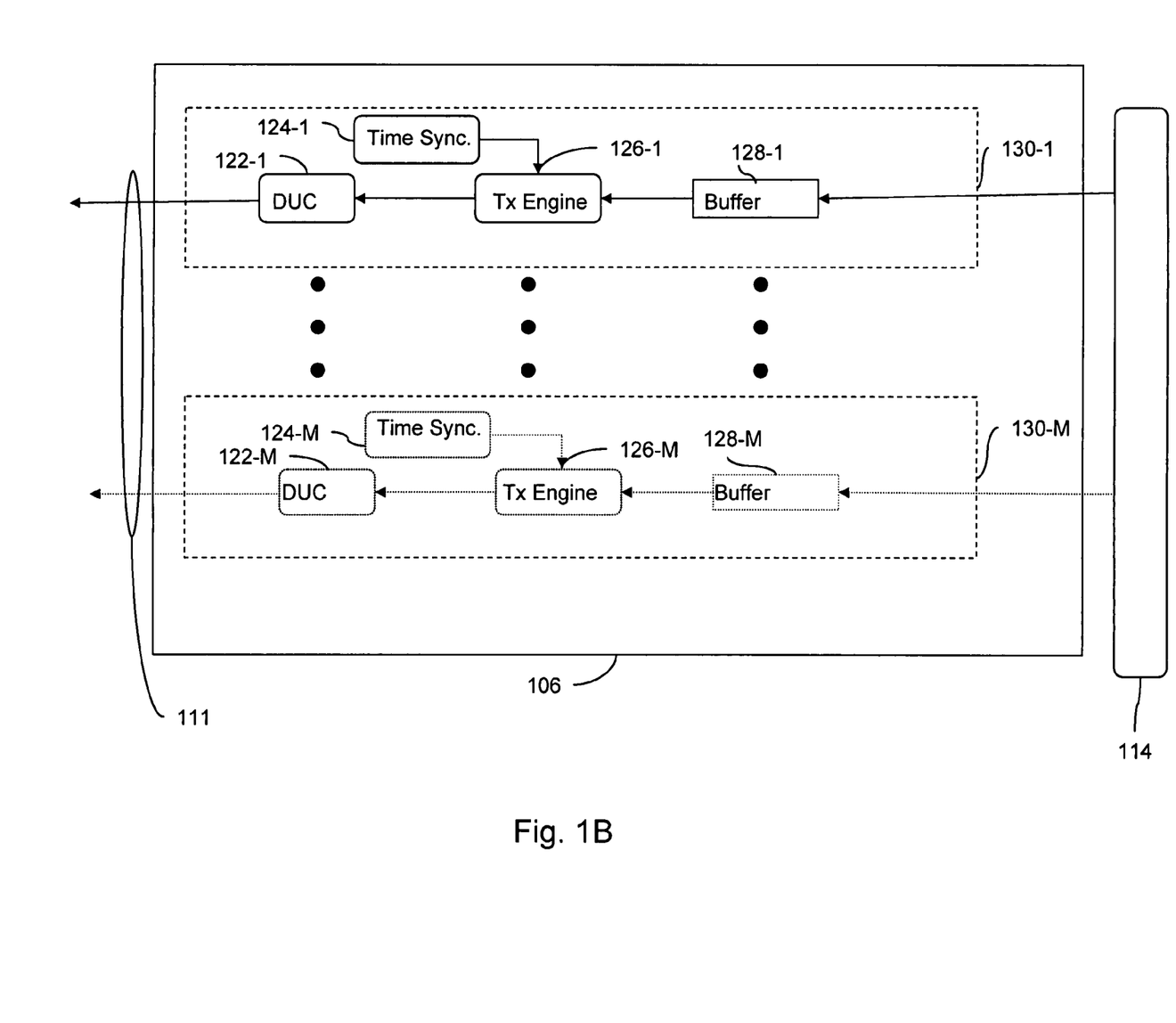

In one embodiment, in the forward link, call processing software module 114 compiles voice and data information from communication networks 120 into collections of complex RF data samples. In one embodiment the collection of complex RF data samples forms a page of complex RF data samples wherein each page contains data samples for one forward logical channel. FIG. 1B illustrates one embodiment of a forward logical channel 130-1 data path. A radio head interface forward logical channel 130-1 comprises a transmit buffer 128-1, a transmit engine 126-1, a digital upconverter (DUC) 122-1 and a time synchronizer 124-1. In operation, in one embodiment, transmit buffer 128-1 receives a page of complex data samples from call processing software 114. Transmit engine 126-1 removes the page of complex data samples from the transmit buffer 128-1 and sends the data samples to DUC 122-1. In one embodiment, transmit engine 126-1 holds the page of complex data samples until time synchronizer 124-1 determines that the current time matches a start time code embedded within the page. When the two times match, transmit engine 126-1 starts transmitting the page of complex data samples to DUC 122-1. In other embodiments, radio head interface 106 comprises a plurality of M forward logical channels 130-1 through 130-M each having transmit buffers 128-1 through 128-M, transmit engines 126-1 through 126-M, DUCs 122-1 through 122-M and time synchronizers 124-1 through 124-M, each processing data sample pages as described above. Additional details on the operation of digital upconverters are provided in the '673 application incorporated herein by reference.

In one embodiment, each page of complex RF data samples further comprises a page header generated by call processing software 114. In one embodiment, the page header comprises two digital quadwords that prefix the complex RF data samples. In one embodiment, the page of complex RF data samples includes 256 quadwords, each quadword having two complex RF data samples. In one embodiment, each quadword is 64 bits long. Although embodiments of the present invention are illustrated using pages having 258 quadwords of 64 bits in length (i.e. each page having 2 quadwords of page header plus 256 quadwords of complex RF data samples), it will be understood by those in the art that embodiments of the present invention apply to any finite length page containing digital data and embodiments are not limited by the bit lengths or formatting of digital words comprising the RF data samples.

A loss of synchronization between call processing software 114 and radio head interface module 106 is illustrated by the following example. In the embodiment described in the above paragraph each page (page header and complex RF data samples together) is 258 quadwords in length. If a data stream ever drops a quadword or repeats a quadword, then synchronization is lost because call processing software 114 and radio head interface module 106 will no longer agree on which set of 258 consecutive quadwords comprise a single page. The radio head interface module and the call processing software are no longer in agreement concerning page boundaries and quadwords containing complex RF data samples can be confused as page headers and vise-versa.

Figure 2A:
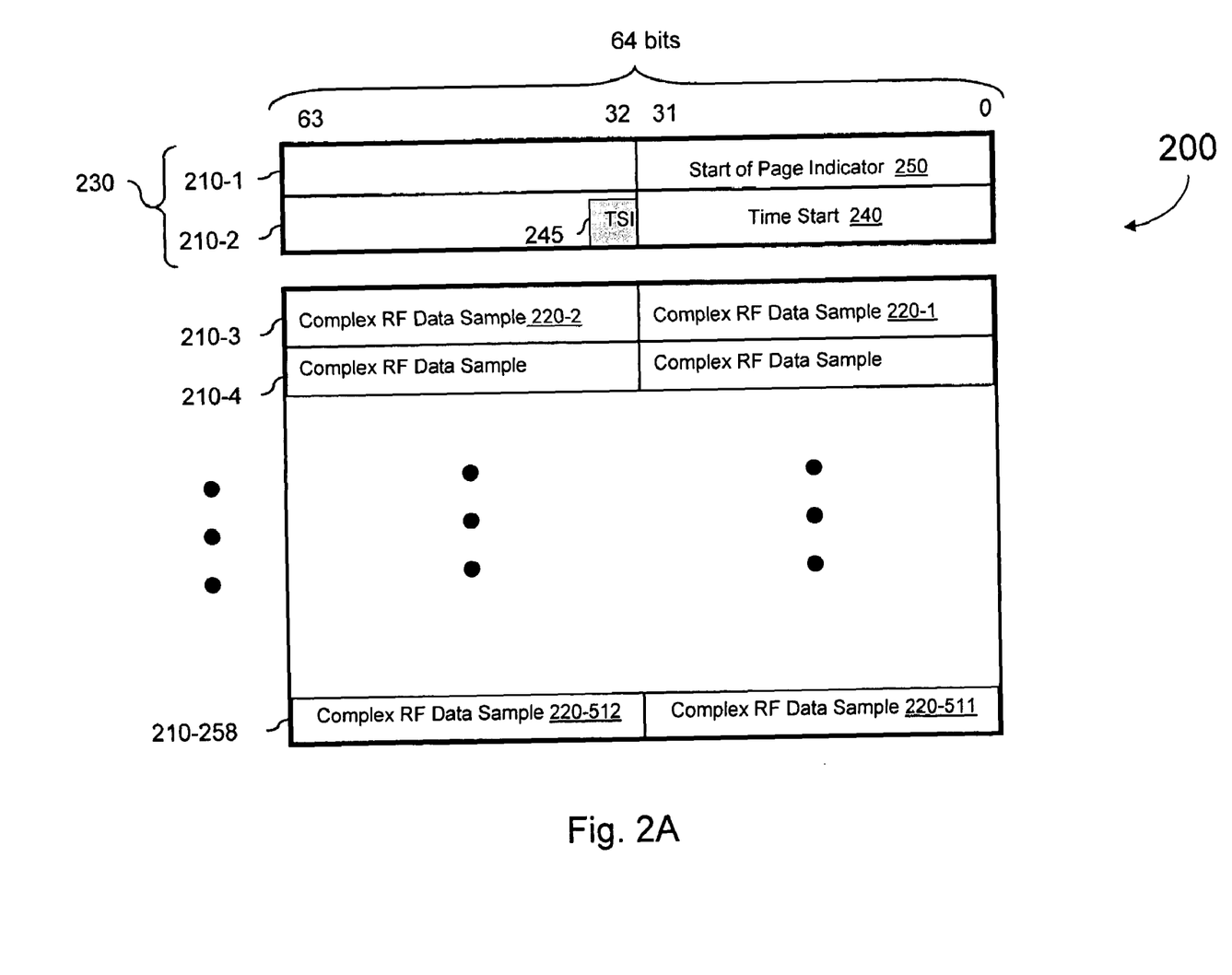
FIGS. 2A, 2B and 2C are an illustrations of page synchronization for pages of complex RF data samples for a forward logical channel.

FIG. 2A illustrates a 258 quadword transmit page 200 for a forward logical channel of one embodiment of the present invention. Transmit page 200 comprises a plurality of quadwords (210-1 to 210-258). In one embodiment quadwords 210-3 to 210-258 are 64 bits in length and each carry two complex RF data samples (such as data samples 220-1 and 220-2) which represent voice and data communications carried across a communications network such as network 100. In one embodiment, page 200 includes a page header 230 comprised of two quadwords 210-1 and 210-2 each 64 bits in length. Page header quadwords 210-1 and 210-2 would not typically carry complex RF data samples, but instead may contain other information including but not limited to system control information or page identification information. For example, in one embodiment, quadword 210-2 contains a time start 240 representing the time transmit engine 126-1 should start sending the first complex RF data sample 220-1 of quadword 210-3 to DUC 122-1. In one embodiment, quadword 210-2 further contains a time start indicator (TSI) 245. In one embodiment, if TSI 245 is set (e.g. set to 1) then transmit engine 126-1 will observe the time indicated by time start 240. If TSI 245 is not set (e.g. set to 0) then transmit engine 126-1 will ignore the value of time start 240 and starts sending the first complex RF data sample of quadword 210-3 to DUC 122-1 immediately after the previous page is transmitted. Additional details pertaining to page headers and the type of information carried within page headers is provided in the '675 application incorporated herein by reference.

Figure 2B:
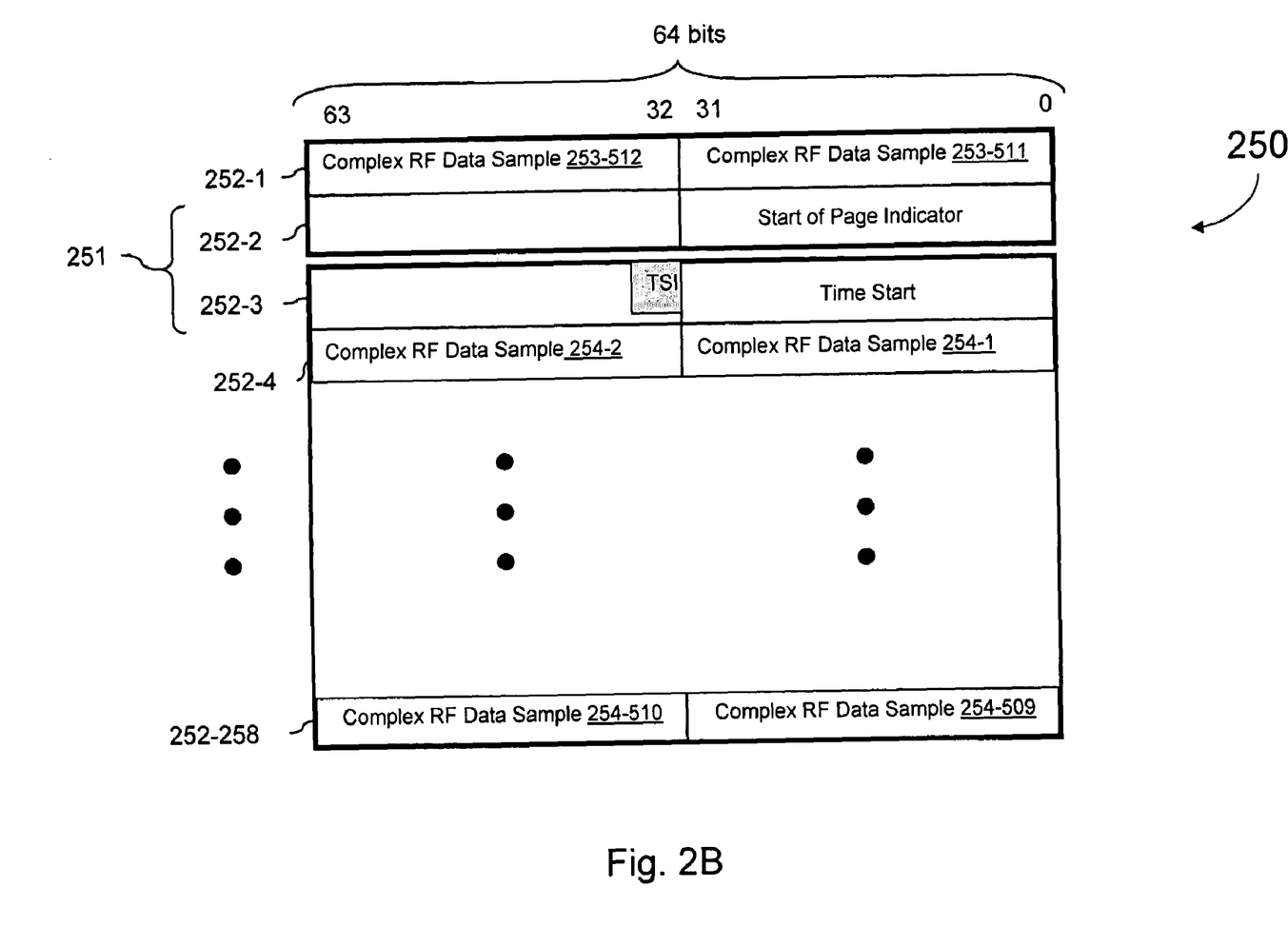
Figure 2C:
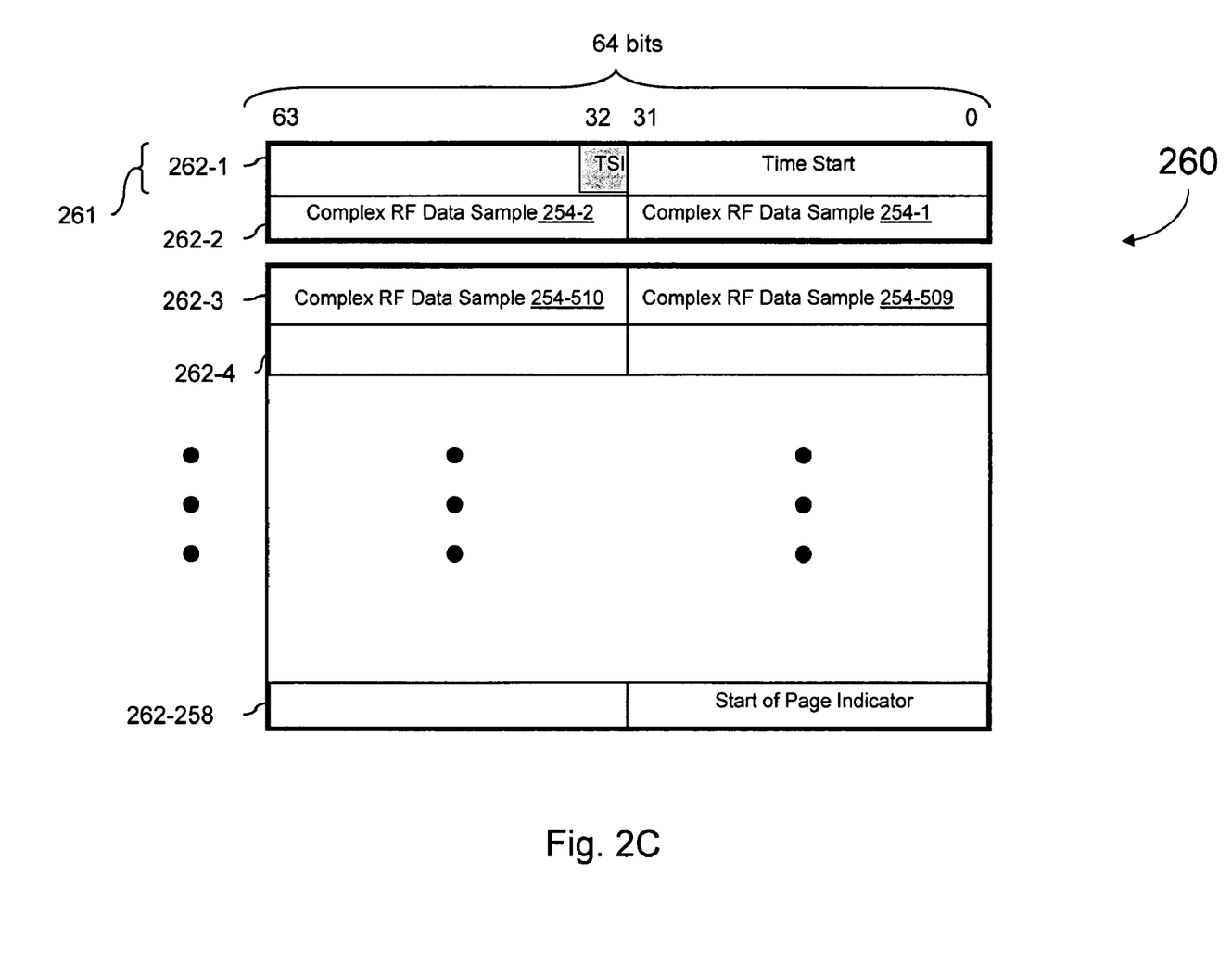

FIGS. 2B and 2C illustrate examples of other transmit pages 250 and 260 of the same form as transmit page 200, but as observed by a radio head interface module 106 during loss-of-synchronization events. FIG. 2B illustrates a transmit page 250 where one quadword of a previous page was repeated, thus shifting down page header 251 one quadword position from its expected position. Without loss-of-synchronization detection, radio head interface module 106 would wrongly conclude that quadwords 252-1 and 252-2 contain valid page header information while quadword 252-3 contains complex RF data samples representing voice and data communications. Instead, quadword 252-1 contains complex RF data samples 253-511, 253-512 that should have been transmitted with a page previous to page 250. Meanwhile quadword 252-3 contains page header information instead on complex RF data samples 254-1, 254-2. Similar erroneous extra quadwords could also be generated from system noise.

FIG. 2C illustrates a transmit page 260 where one quadword of a previous page was dropped, thus shifting up page header 261 one quadword position from its expected position. As a result, the first quadword of page header 261 is lost, having been appended to the page previous to page 260. Additionally, a first quadword for the page header of the page following page 260 will erroneously occupy the last quadword 262-258 of transmit page 260. Without loss-of-synchronization detection, radio head interface module 106 would wrongly conclude that quadwords 262-1 and 262-2 contain valid page header information while quadwords 252-3 through 252-258 all contain complex RF data samples representing voice and data communications. One situation where this may occur is when radio head interface module 106 is restarted for any reason and call processing software module 114 is unaware of this restart.

Embodiments of the present invention utilize a fixed synchronization word located at a defined position within a page header as a reference to identify the boundaries of a page. In one embodiment, the fixed synchronization word is a start of page indicator (PSI) located within the first quadword of a page header. Referring to FIG. 2a, in one embodiment, quadword 232-1 contains a start of page indicator (PSI) 250. Radio head interface module 106 continuously looks for PSI at the beginning of each page processed by transmit engine 126-1. If PSI 250 is not found when PSI 250 is expected, Radio head interface module 106 concludes that is has lost synchronization with call processing software module 114. In one embodiment, Radio head interface module 106 stops the transfer of complex RF data samples to DUC 122-1 and starts looking for PSI 250 at every quadword received from call processing software module 114. When PSI 250 is again found, Radio head interface module 106 defines the quadword containing PSI 250 as the transmit page boundary and resumes transfer of complex RF data samples to DUC 122-1. In one embodiment, PSI 250 is always comprised of a fixed 32 bit double word. In one embodiment, PSI 250 comprises the 32 bit double word CCCCCCCCh and is always located in page header 230 quadword 210-1 bits 0 to 31. In one embodiment radio head interface module 106 is unlikely to confuse a normal complex RF data sample 220-1 through 220-512 as PSI 250 because each complex RF data sample 220-1 through 220-512 is a double word comprised of two 14 bits words while PSI 250 is 32 bits in length.

Embodiments of the present invention provide the following advantages: 1) loss of synchronization detection is automatic, 2) loss of synchronization detection time is fast—occurring within one page of the loss of synchronization, 3) resynchronization is automatic, 4) resynchronization is fast—occurring within one page of when the loss of synchronization is detected, and 5) as will be illustrated below, forward and reverse path detection and resynchronization are independent.

Figure 1C:
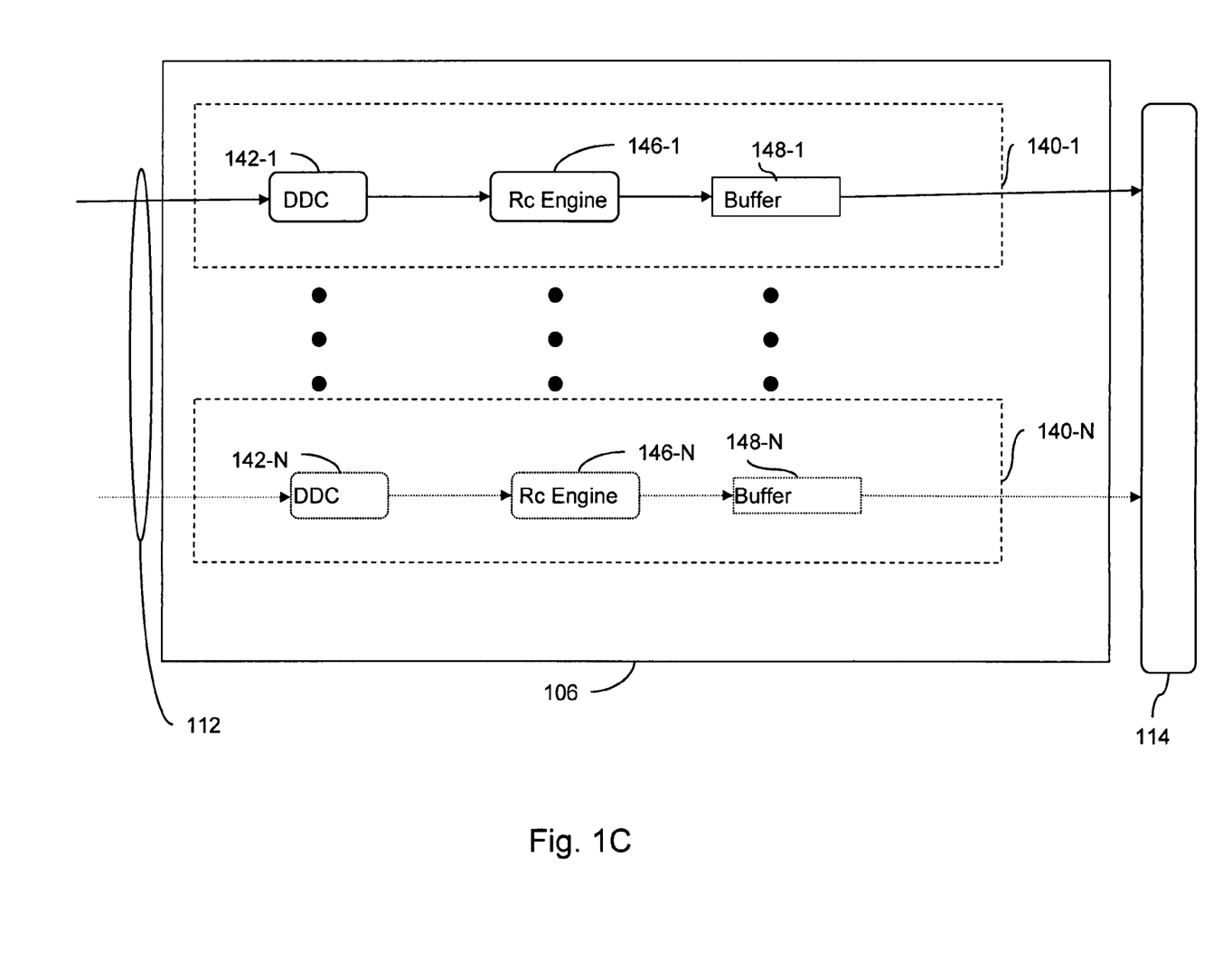

FIG. 1C illustrates one embodiment of a reverse logical channel 140-1 data path. A radio head interface reverse logical channel comprises a receive buffer 148-1, a receive engine 146-1, and a digital down converter (DDC) 142-1. In operation, in one embodiment, receive engine 146-1 receives complex RF data samples from DDC 142-1 and sends the complex RF data samples to receive buffer 148-1. In one embodiment, as receive buffer 148-1 receives the complex RF data samples, a page of complex RF data samples is formed in receive buffer 148-1. When completed, receive engine 146-1 inserts a page header into receive buffer 148-1 with the complex RF data samples and the page is transmitted by radio head interface module 106 to call processing software module 114. In other embodiments, radio head interface 106 comprises a plurality of N reverse logical channels 140-1 through 140-N each having receive buffers 148-1 through 148-N, receive engines 146-1 through 146-N, and DDCs 142-1 through 142-N, each processing data sample pages as described above. Additional details pertaining to digital downconverters are provided in the '673 application herein incorporated by reference.

To detect a loss of synchronization in the reverse link, embodiments of the present invention utilize a fixed synchronization word located at a defined position within a reverse page header as a reference to identify the boundaries of a page. In one embodiment, the fixed synchronization word is a PSI located within the first quadword of a reverse link page header.

Figure 3:
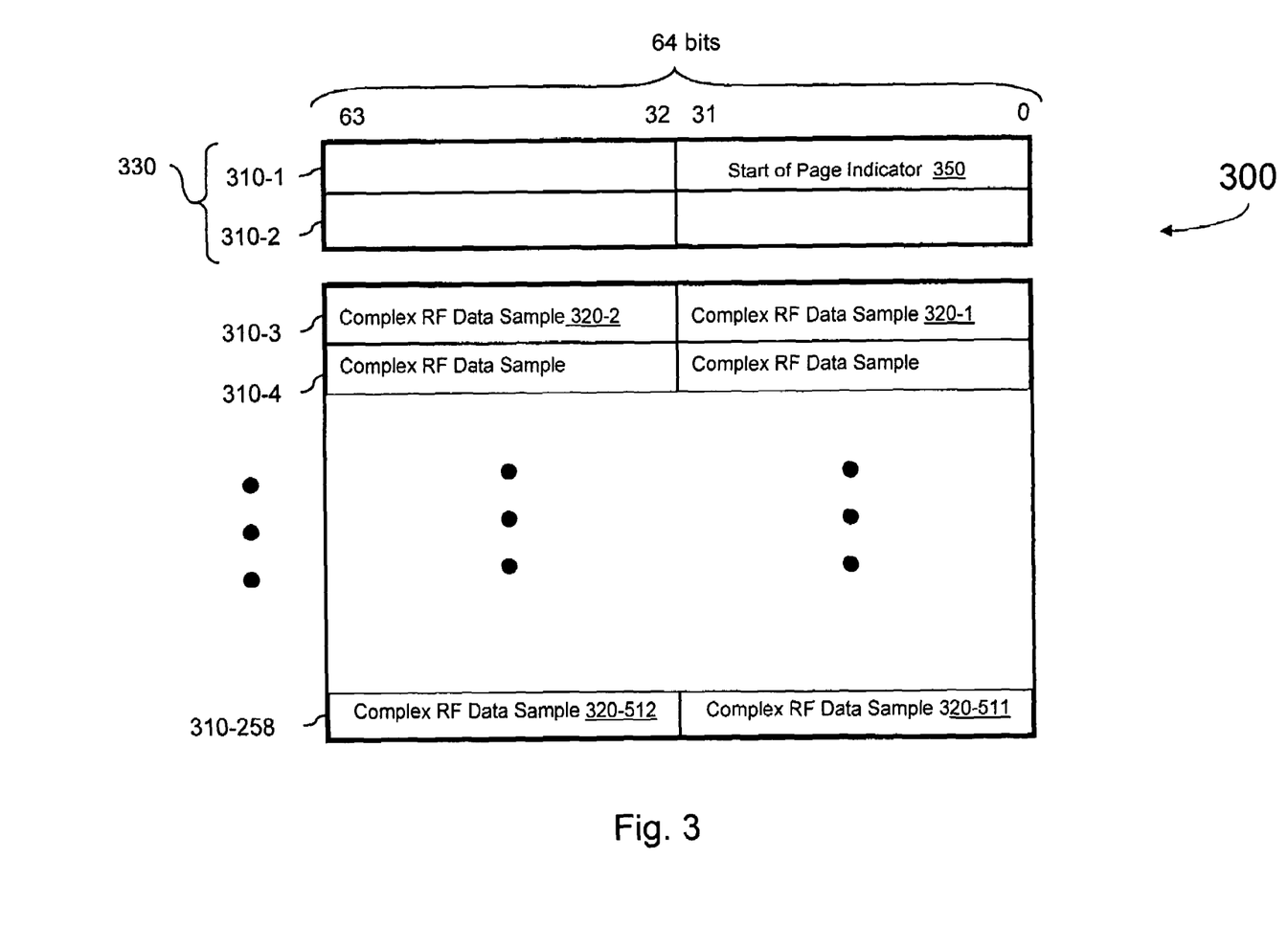
FIG. 3 is an illustration of a page of complex RF data samples for a reverse logical channel, having a page header.

FIG. 3 illustrates a 258 quadword receive page 300 for a reverse logical channel 140-1 of one embodiment of the present invention. Receive page 300 comprises a plurality of quadwords (310-1 to 310-258). In one embodiment quadwords 310-3 to 310-258 are 64 bits in length and each carry two complex RF data samples (such as data samples 320-1 through 320-512) which represent voice and data communications carried across a communications network such as network 100. In one embodiment, page 300 includes a page header 330 comprised of two quadwords 310-1 and 310-2 each 64 bits in length. In one embodiment, call processing software module 114 continuously looks for PSI 350 at the beginning of each page 300 received from reverse logical channel 140-1. If PSI 350 is not found when PSI 350 is expected, call processing software module 114 concludes that is has lost synchronization with Radio head interface module 106. In one embodiment, call processing software module 114 stops processing complex RF data samples from reverse logical channel 140-1 and starts looking for PSI 350 at every quadword received from reverse logical channel 140-1. When PSI 350 is again found, call processing software module 114 defines the quadword containing PSI 350 as the receive page boundary and resumes processing of complex RF data samples to communications network 120. In one embodiment, PSI 350 is always comprised of a fixed 32 bit double word. In one embodiment, PSI 350 comprises the 32 bit double word CCCCCCCCh and is always located in page header 330 quardword 310-1 bits 0 to 31. In one embodiment radio head interface module 106 is unlikely to confuse a normal complex RF data sample 320-1 through 320-512 as PSI 350 because each complex RF data sample 320-1 through 320-512 is a double word comprised of two 14 bits words while PSI 350 is 32 bits in length.

Figure 4:
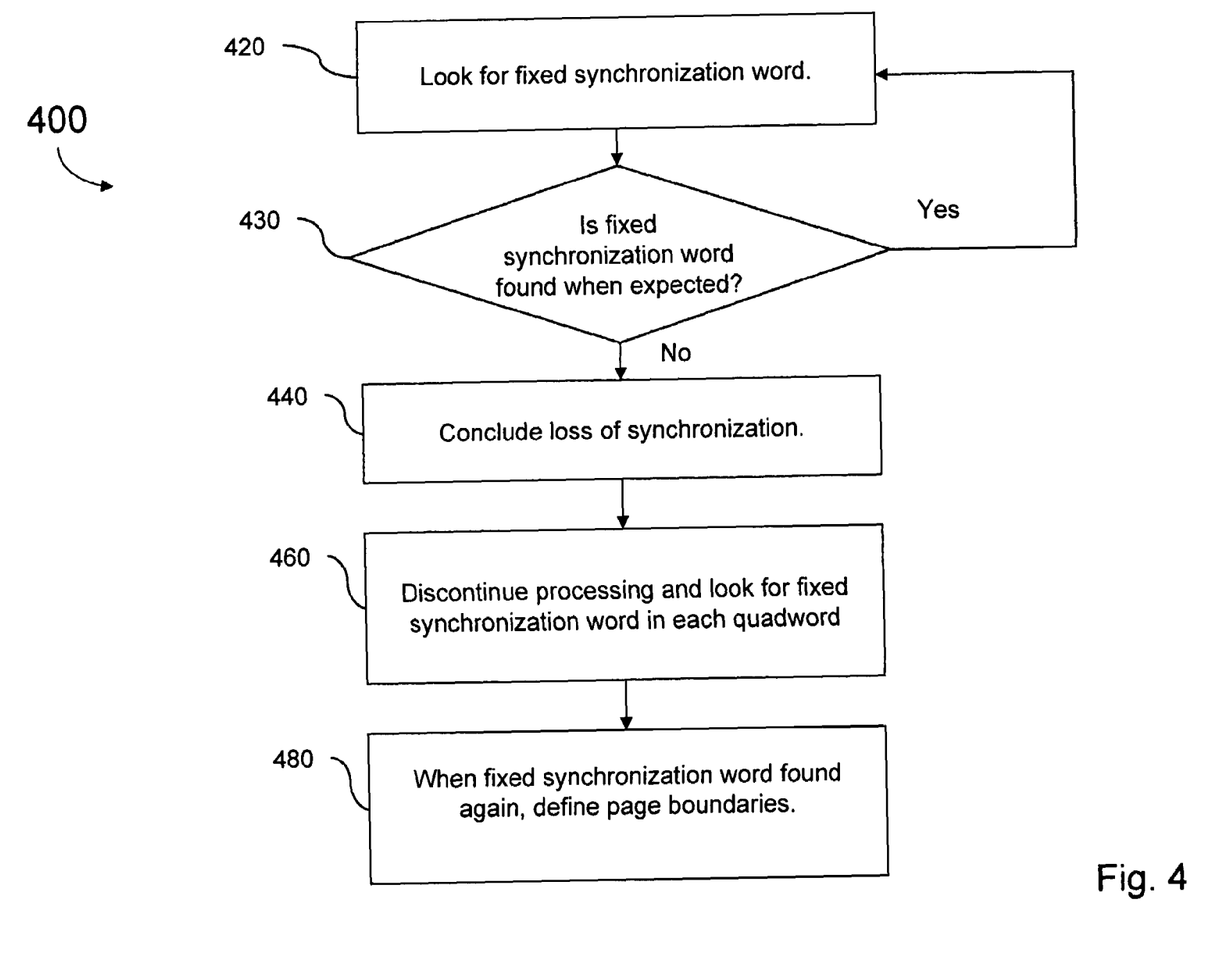
FIG. 4 is a flow chart of a method for practicing one embodiment.

FIG. 4 is a flowchart illustrating a method 400 of one embodiment of the present invention. The method first comprises continuously looking for a fixed synchronization word at the beginning of each page received (420) and determining if the fixed synchronization word is found when expected (430). If the fixed synchronization word is found when expected, continue looking for a fixed synchronization word at the beginning of each page received (420). If the fixed synchronization word is not found when is expected, conclude a loss of synchronization between the call processing software module and the radio head interface module has occurred (440), discontinue processing of complex RF data samples (460) and start looking for a PSI in every quadword received (470). When the fixed synchronization word is again found, define the quadword containing the fixed synchronization word as the page boundary (480) and resume processing of complex RF data signals.

Several ways are available to implement the radio head interface module and server elements of the current invention. These include, but are not limited to, digital computer systems, programmable controllers, or field programmable gate arrays. Therefore other embodiments of the present invention are the program instructions resident on computer readable media which when implemented by such controllers, enable the controllers to implement embodiments of the present invention. Computer readable media include any form of computer memory, including but not limited to punch cards, magnetic disk or tape, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, the system comprising:
one or more radio head interface modules; and
a call processing software module, the one or more radio head interface modules adapted to communicate with the call processing software module;
wherein the call processing software module performs modulation and demodulation of voice and data streams using one or more air interface standards;
wherein the call processing software module communicates a forward data stream to a first radio head interface of the one or more radio head interface modules;
wherein the forward data stream comprises a plurality of data samples representing voice and data streams and a plurality of fixed synchronization words;
wherein when the first radio head interface module does not observe the receipt of a first fixed synchronization word of the plurality of fixed synchronization words word from the call processing software module when expected, the first radio head interface module concludes that it has lost synchronization with the call processing software module; wherein the first radio head interface module further comprises:
a transmit buffer, the transmit buffer adapted to receive the forward data stream from the call processing software module, the transmit buffer adapted to store the forward data stream as a page of data samples having the fixed synchronization word within a page header;
a transmit engine; and
a digital upconverter;
the transmit engine adapted to transfer the data samples of the page of data samples from the transmit buffer to the digital upconverter;
the radio head interface module adapted to observe a first fixed synchronization word at an expected position within a first page of data samples;
wherein the radio head interface module is further adapted to stop transferring the data samples of the page of data samples from the transmit buffer to the digital upconverter when the first fixed synchronization word is not found at the expected position.

2. The system of claim 1, further comprising:
one or more interface devices, wherein the one or more radio head interface modules communicate with the call processing software module over the one or more interface devices.

3. The system of claim 2, wherein the one or more interface devices includes at least one of a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface and a high speed parallel interface.

4. The system of claim 1, wherein the one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

5. The system of claim 1, wherein the forward data stream further comprises a plurality of quadwords, wherein one or more quadwords of the plurality of quadwords each contain two data samples.

6. The system of claim 5, wherein each data sample is a complex RF data sample.

7. The system of claim 5, one or more quadwords of the plurality of quadwords contain a page header, wherein a fixed synchronization word of the plurality of fixed synchronization words is contained within the page header.

8. The system of claim 7, wherein the one or more quadwords containing the page header precede the one or more quadwords containing the two data samples to define a page of data samples.

9. The system of claim 5, wherein each quadword is 64 bits long.

10. The system of claim 1, wherein the radio head interface module further adapted to observe a second fixed synchronization word within a second page of data samples received from the call processing software module.

11. The system of claim 10, wherein upon observation of the second fixed synchronization word, the radio head interface module resumes transferring the data samples of the page of data samples from the transmit buffer to the digital upconverter.

12. The system of claim 1, wherein the first radio head interface module communicates a reverse data stream to the call processing software module;
- wherein the reverse data stream comprises a plurality of data samples representing voice and data streams and a plurality of fixed synchronization words;
- wherein when the call processing software module does not observe the receipt of a first fixed synchronization word of the plurality of fixed synchronization words from the first radio head interface module when expected, then the call processing software module concludes that it has lost synchronization with the first radio head interface module.

13. The system of claim 12, wherein the forward data stream further comprises a plurality of quadwords, wherein one or more quadwords of the plurality of quadwords each contain two data samples.

14. The system of claim 13, wherein each data sample is a complex RF data sample.

15. The system of claim 13, one or more quadwords of the plurality of quadwords contain a page header, wherein a fixed synchronization word of the plurality of fixed synchronization words is contained within the page header.

16. The system of claim 15, wherein the one or more quadwords containing the page header precede the one or more quadwords containing the two data samples to define a page of data samples.

17. The system of claim 13, wherein each quadword is 64 bits long.

18. The system of claim 12, wherein the radio head interface module further comprises:
- a receive buffer;
- a receive engine; and
- a digital downconverter;
- the receive engine adapted to transfer a data stream from the digital downconverter to the receive buffer, the receive buffer adapted to store the data stream as a page of data samples having a fixed synchronization word within a page header, the receive buffer further adapted to output the data stream as the page of data samples to the call processing software;
- the call processing software module adapted to look for a first fixed synchronization word at an expected position within a first page of data samples;
- the call processing software module further adapted to stop processing the data stream received from the radio head interface module when the first fixed synchronization word is not found at the expected position;
- the call processing software further adapted to observe a second fixed synchronization word within a second page of data samples received from the radio head interface module;
- upon observation of the second fixed synchronization word, the call processing software resume processing of the data stream received from the radio head interface module.

19. A radio head interface for a communications system, the radio head interface comprising:
- a transmit buffer, the transmit buffer adapted to receive a forward data stream from a call processing software module, wherein the forward data stream comprises a plurality of data samples representing voice and data streams and a plurality of fixed synchronization words;
- the transmit buffer adapted to store the forward data stream as a page of data samples;
- a transmit engine; and
- a digital upconverter;
- the transmit engine adapted to transfer the data samples of the page of data samples from the transmit buffer to the digital upconverter;
- the radio head interface module adapted to observe a first fixed synchronization word at an expected position within a first page of data samples;
- the radio head interface module further adapted to stop transferring the data samples of the page of data samples from the transmit buffer to the digital upconverter when the first fixed synchronization word is not found at the expected position;
- the radio head interface module further adapted to observe a second fixed synchronization word within a second page of data samples received from the call processing software module;
- upon observation of the second fixed synchronization word, the radio head interface module resumes transferring the data samples of the page of data samples from the transmit buffer to the digital upconverter.

20. The system of claim 19, wherein each data sample is a complex RF data sample.

21. The system of claim 19, wherein the forward data stream further comprises a plurality of quadwords, wherein one or more quadwords of the plurality of quadwords each contain two data samples.

22. The system of claim 21, one or more quadwords of the plurality of quadwords contain a page header, wherein a fixed synchronization word of the plurality of fixed synchronization words is contained within the page header.

23. The system of claim 22, wherein the one or more quadwords containing the page header precede the one or more quadwords containing the two data samples to define a page of data samples.

24. The system of claim 21, wherein each quadword is 64 bits long.

25. A method of page resynchronization, the method comprising:
- communicating a data stream between a radio head interface module and a call processing software module, wherein the data stream comprises a plurality of data samples representing voice and data streams and a plurality of fixed synchronization words;
- storing the data stream as a page of data samples in a buffer, the page of data samples including at least one of the plurality of fixed synchronization words;
- transferring the page of data samples between the buffer and a digital frequency converter;
- observing the receipt of a first fixed synchronization word of the plurality of fixed synchronization words at an expected position within the data stream; and
- when the first fixed synchronization word does not occur when expected on a first logical channel, discontinue transferring the page of data samples between the buffer and a digital frequency converter and concluding that a loss of synchronization has occurred on the first logical channel between the radio head interface module and the call processing software module;
- wherein when the first logical channel is a forward logical channel, the method further comprises:
- transmitting the data stream to a digital upconverter;
- discontinuing transmitting the data stream to the digital upconverter upon concluding that a loss of synchronization has occurred between the radio head interface module and the call processing software module;
- observing the receipt of a second fixed synchronization word; and upon observation of the second fixed synchronization word, resuming transmitting the data stream to the digital upconverter.

26. The method of claim 25, wherein observing the receipt of a first fixed synchronization word of the plurality of fixed synchronization words at an expected position within the data stream further comprises:
expecting to observe the first fixed synchronization word within the Nth word of a page of data samples.

27. The method of claim 25, wherein observing the receipt of a first fixed synchronization word of the plurality of fixed synchronization words at an expected position within the data stream further comprises:
expecting to observe the first fixed synchronization word within the Nth quadword of a page of data samples having a plurality of quadwords.

28. The method of claim 25, wherein observing the receipt of a first fixed synchronization word of the plurality of fixed synchronization words at an expected position within the data stream further comprises:
expecting to observe the first fixed synchronization word within the first quadword of a page of data samples having a plurality of quadwords.

29. A method of page resynchronization, the method comprising:
communicating a data stream between a radio head interface module and a call processing software module, wherein the data stream comprises a plurality of data samples representing voice and data streams and a plurality of fixed synchronization words;
storing the data stream as a page of data samples in a buffer, the page of data samples including at least one of the plurality of fixed synchronization words;
transferring the page of data samples between the buffer and a digital frequency converter;
observing the receipt of a first fixed synchronization word of the plurality of fixed synchronization words at an expected position within the data stream; and
when the first fixed synchronization word does not occur when expected on a first logical channel, discontinue transferring the page of data samples between the buffer and a digital frequency converter and concluding that a loss of synchronization has occurred on the first logical channel between the radio head interface module and the call processing software module;
wherein when the first logical channel is a reverse logical channel, the method further comprising:
transmitting the data stream to a communications network;
discontinuing transmitting the data stream to the communications network upon concluding that a loss of synchronization has occurred between the radio head interface module and the call processing software module;
observing the receipt of a second fixed synchronization word; and
upon observation of the second fixed synchronization word, resuming transmitting the data stream to the communications network.

30. A computer-readable medium having computer-executable instructions for page resynchronization, the method comprising:
communicating a data stream between a radio head interface module and a call processing software module, wherein the data stream comprises a plurality of data samples representing voice and data streams and a plurality of fixed synchronization words;
storing the data stream as a page of data samples in a buffer, the page of data samples including at least one of the plurality of fixed synchronization words;
transferring the page of data samples between the buffer and a digital frequency converter;
observing the receipt of a first fixed synchronization word of the plurality of fixed synchronization words at an expected position within the data stream; and
when the first fixed synchronization word does not occur when expected on a first logical channel, discontinue transferring the page of data samples between the buffer and a digital frequency converter and concluding that a loss of synchronization has occurred on the first logical channel between the radio head interface module and the call processing software module;
wherein when the first logical channel is a forward logical channel, the method further comprises:
transmitting the data stream to a digital upconverter;
discontinuing transmitting the data stream to the digital upconverter upon concluding that a loss of synchronization has occurred between the radio head interface module and the call processing software module;
observing the receipt of a second fixed synchronization word; and
upon observation of the second fixed synchronization word, resuming transmitting the data stream to the digital upconverter.

31. The method of claim 30, wherein observing the receipt of a first fixed synchronization word of the plurality of fixed synchronization words at an expected position within the data stream further comprises:
expecting to observe the first fixed synchronization word within the Nth word of a page of data samples.

32. The method of claim 30, wherein observing the receipt of a first fixed synchronization word of the plurality of fixed synchronization words at an expected position within the data stream further comprises:
expecting to observe the first fixed synchronization word within the Nth quadword of a page of data samples having a plurality of quadwords.

33. The method of claim 30, wherein observing the receipt of a first fixed synchronization word of the plurality of fixed synchronization words at an expected position within the data stream further comprises:
expecting to observe the first fixed synchronization word within the first quadword of a page of data samples having a plurality of quadwords.

34. A computer-readable medium having computer-executable instructions for page resynchronization, the method comprising:
communicating a data stream between a radio head interface module and a call processing software module, wherein the data stream comprises a plurality of data samples representing voice and data streams and a plurality of fixed synchronization words;
storing the data stream as a page of data samples in a buffer, the page of data samples including at least one of the plurality of fixed synchronization words;
transferring the page of data samples between the buffer and a digital frequency converter;
observing the receipt of a first fixed synchronization word of the plurality of fixed synchronization words at an expected position within the data stream; and
when the first fixed synchronization word does not occur when expected on a first logical channel, discontinue transferring the page of data samples between the buffer and a digital frequency converter and concluding that a loss of synchronization has occurred on the first logical channel between the radio head interface module and the call processing software module;
  wherein when the first logical channel is a reverse logical channel, the method further comprising:
  transmitting the data stream to a communications network;
  discontinuing transmitting the data stream to the communications network upon concluding that a loss of synchronization has occurred between the radio head interface module and the call processing software module;
  observing the receipt of a second fixed synchronization word; and
  upon observation of the second fixed synchronization word, resuming transmitting the data stream to the communications network.

35. A communications system, the system comprising:
one or more radio head interface modules;
means for modulating and demodulating voice and data streams using one or more air interface standards;
means for communicating a forward data stream to a first radio head interface module of the one or more radio head interface modules, wherein the forward data stream comprises a plurality of data samples representing voice and data streams and a plurality of fixed synchronization words;
the first radio head interface module including:
  means for storing the forward data stream as a page of data samples in a buffer, the page of data samples including at least one of the plurality of fixed synchronization words;
  means for transferring the page of data samples between the means for storing the forward data stream and the means for modulating and demodulating;
  means for observing the receipt of a first fixed synchronization word of the plurality of fixed synchronization words sent from the means for modulating and demodulating voice and data streams at an expected position,
  means to stop transferring the page of data samples between the means for storing the forward data stream and the means for modulating and demodulating when the first fixed synchronization word is not observed at the expected position;
  means to observe a second fixed synchronization word sent from the means for modulating and demodulating voice and data streams;
  means to resume transferring the page of data samples between the means for storing the forward data stream and the means for modulating and demodulating upon observation of the second fixed synchronization word.

36. The system of claim 35, wherein the one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

37. The system of claim 35, wherein each data sample is a complex RF data sample.

38. The system of claim 35, wherein the forward data stream further comprises a plurality of quadwords, wherein one or more quadwords of the plurality of quadwords each contain two data samples.

39. The system of claim 38, one or more quadwords of the plurality of quadwords contain a page header, wherein a fixed synchronization word of the plurality of fixed synchronization words is contained within the page header.

40. The system of claim 39, wherein the one or more quadwords containing the page header precede the one or more quadwords containing the two data samples to define a page of data samples.

41. The system of claim 39, wherein each quadword is 64 bits long.

42. A communications system, the system comprising:
one or more radio head interface modules;
means for modulating and demodulating voice and data streams using one or more air interface standards;
means for communicating a reverse data stream from a first radio head interface module of the one or more radio head interface modules to the means for modulating and demodulating voice and data streams, wherein the reverse data stream comprises a plurality of data samples representing voice and data streams and a plurality of fixed synchronization words;
the means for modulating and demodulating voice and data streams including:
  means for storing the reverse data stream as a page of data samples in a buffer, the page of data samples including at least one of the plurality of fixed synchronization words;
  means for transferring the page of data samples between the means for storing the reverse data stream and the first radio head interface module;
  means for observing the receipt of a first fixed synchronization word of the plurality of fixed synchronization words sent from the first radio head interface module at an expected position,
  means to stop transferring the page of data samples between the means for storing the reverse data stream and the first radio head interface module when the first fixed synchronization word is not observed at the expected position;
  means to observe a second fixed synchronization word sent from the first radio head interface module;
  means to resume transferring the page of data samples between the means for storing the reverse data stream and the first radio head interface module upon observation of the second fixed synchronization word.

43. The system of claim 42, wherein the one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

44. The system of claim 42, wherein each data sample is a complex RF data sample.

45. The system of claim 42, wherein the forward data stream further comprises a plurality of quadwords, wherein one or more quadwords of the plurality of quadwords each contain two data samples.

46. The system of claim 45, wherein one or more quadwords of the plurality of quadwords contain a page header, wherein a fixed synchronization word of the plurality of fixed synchronization words is contained within the page header.

47. The system of claim 46, wherein the one or more quadwords containing the page header precede the one or more quadwords containing the two data samples to define a page of data samples.

48. The system of claim 45, wherein each quadword is 64 bits long.

* * * * *